US007140011B2

(12) United States Patent
Hallford

(10) Patent No.: US 7,140,011 B2
(45) Date of Patent: Nov. 21, 2006

(54) DYNAMICALLY LOADING PROGRAM CODE OVER A PUSH-BASED NETWORK

(75) Inventor: Jason Hallford, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 09/735,434

(22) Filed: Dec. 12, 2000

(65) Prior Publication Data

US 2002/0073245 A1 Jun. 13, 2002

(51) Int. Cl.
G06F 9/44 (2006.01)
(52) U.S. Cl. ...................... 717/165; 717/167; 717/162; 717/163
(58) Field of Classification Search ........ 717/162–178; 709/200–203, 207–222
See application file for complete search history.

(56) References Cited

U.S. PATENT DOCUMENTS

| | | | | | |
|---|---|---|---|---|---|
| 5,724,345 | A | * | 3/1998 | Guarneri et al. | 370/316 |
| 5,937,411 | A | * | 8/1999 | Becker | 707/103 R |
| 6,289,510 | B1 | * | 9/2001 | Nakajima | 717/170 |
| 6,359,571 | B1 | * | 3/2002 | Endo et al. | 340/988 |
| 6,467,089 | B1 | * | 10/2002 | Aust et al. | 725/13 |
| 6,480,783 | B1 | * | 11/2002 | Myr | 701/117 |
| 6,526,455 | B1 | * | 2/2003 | Kamimura | 709/316 |
| 6,571,389 | B1 | * | 5/2003 | Spyker et al. | 717/176 |
| 6,574,518 | B1 | * | 6/2003 | Lounsberry et al. | 700/90 |
| 6,578,199 | B1 | * | 6/2003 | Tsou et al. | 717/178 |
| 6,617,980 | B1 | * | 9/2003 | Endo et al. | 340/905 |

FOREIGN PATENT DOCUMENTS

| | | |
|---|---|---|
| EP | 0 902 569 A1 | 3/1999 |
| EP | 1 028 551 A2 | 8/2000 |
| WO | WO 01/17195 A2 | 3/2001 |

OTHER PUBLICATIONS

Wieland Holfelder, "Interactive Remote Recording and Playback of Multicast Videoconferences," Sep. 10, 1997, pp. 450-463, XP002088645.
Dr. P. Haubner, et al, "Netzdienste für Multimediale Anwendungen CSCW—MBone," Teleseminar Mutlimedia Systeme-Technologie und Gestaltung WS 95-96, 1996, pp. 1-20, XP002248684.
Tina Wong, Multicast Push Service for Web Content, CS294-6 Internet Services Project Report, Aug. 26, 2004, pp. 4.
William Blundon, Blundons Corner, When Push comes to shove, Apr. 1997, pp. 4.
Datta et, al. , IEEE Xplore, Adaptive Broadcast Protocols to Support Power Conservant Retrieval by Mobile Users, Apr. 7-11, 1997, pp. 1-12.

* cited by examiner

Primary Examiner—Kakali Chaki
Assistant Examiner—William H. Wood
(74) Attorney, Agent, or Firm—Blakely, Sokoloff, Taylor & Zafman LLP

(57) ABSTRACT

Programming code, such as dynamically loadable program code used in object oriented programming languages, may be pushed over a unidirectional communication link, such as though a transmitter tower transmission or one-way networking communication protocol. A manifest is created that includes identifiers of programming code that will be pushed onto the unidirectional communication link, where the manifest includes a push schedule. A receiver of the manifest retrieves pushed code of interest according to the schedule. Purchasing data may also be included in the manifest. Programming code may include decryption techniques to allow for pay-per-use retrieval of premium content.

49 Claims, 6 Drawing Sheets

DYNAMICALLY LOADING PROGRAM CODE OVER A PUSH-BASED NETWORK

FIELD OF THE INVENTION

The invention generally relates to pushing programming code over unidirectional communication links, and more particularly, to pushing dynamically loadable program code, such as an object-oriented class definition, over the unidirectional communication link.

BACKGROUND

FIG. 1 illustrates a general prior art hardware environment for pushing data to a receiving computing device.

As illustrated, there is a data-pushing device 100, such as one or more network servers or other computing devices, that pushes data onto a network 102. The data-pushing device is responsible for generating or forwarding data that is ultimately received by a receiving computing device 104. The network can be any combination of conventional and proprietary networks such as an intranet or the Internet.

A receiving computing device 104, also in communication with the network, receives the pushed data. Various protocols for receiving pushed data are known in the art. For example, see the PointCast system by EntryPoint of San Diego, Calif. Generally, the receiving computing device 104 listens to a particular data channel, e.g., a Transmission Control Protocol/Internet Protocol (TCP/IP) network port, broadcast channel, frequency range, etc. for data pushed by the data-pushing device 100.

BRIEF DESCRIPTION OF THE DRAWINGS

The features and advantages of the present invention will become apparent from the following detailed description of the present invention in which.

DETAILED DESCRIPTION

Modern programming languages provide for dynamically loadable, or modular, program code For example, an object-oriented programming (OOP) environment is one in which a program designer defines not only the data type of a data structure, but also the types of operations (e.g., functions/procedures) that can be applied to the data structure. The data structure for a class becomes an object including both data and functions/procedures. A "class" is a category of such objects, and in modern OOP environments, to avoid unnecessary resource consumption, a class can be dynamically loaded and unloaded to conserve resources.

As will be discussed below, dynamic loading can be effected over a push-type of networking environment. For example, identification data of a class can be announced according to the Service Advertising Protocol (SAP)/Session Description Protocol (SDP) protocol, and the class definition broadcast accordingly. Alternatively, a manifest can be defined that contains identifying data for the definition of a class, and a schedule indicating when a second push will be made that contains the actual program code for the identified class. A programming environment and/or application program can then use a custom class loader to integrate, when needed, pushed classes.

In this description and claims that follow, the term manifest is intended to include both transmission of a manifest, or a SAP/SDP type of announcement of its contents.

Figure 1:
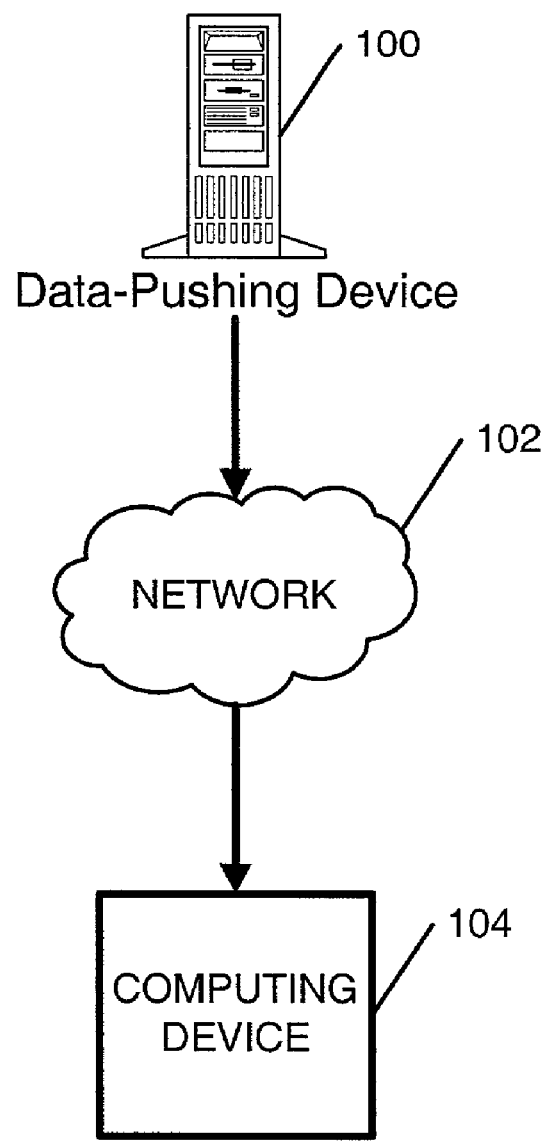
FIG. 1 illustrates a general prior-art hardware environment for pushing data to a receiving computing device.
Figure 2:
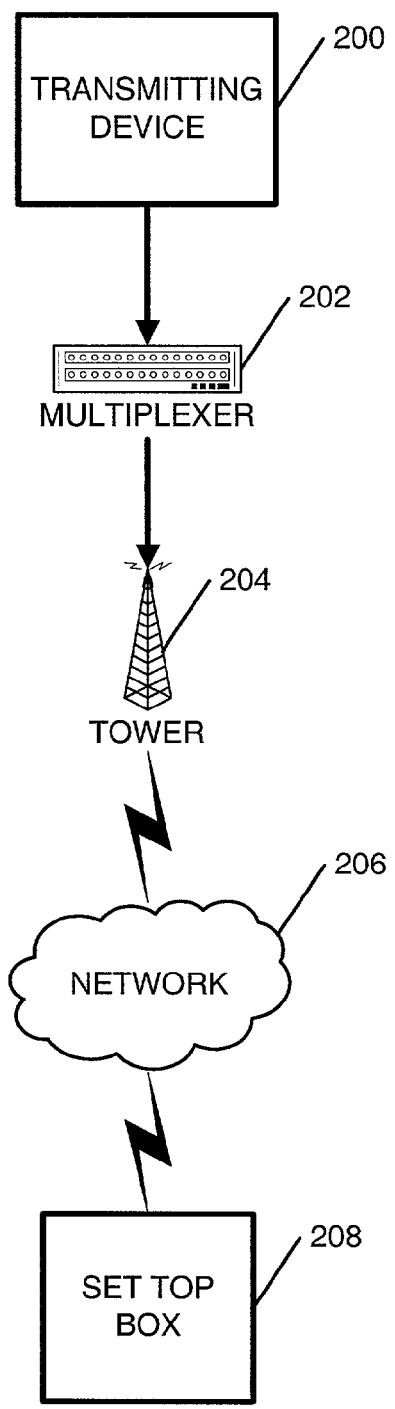
FIG. 2 illustrates a variation on the FIG. 1 push environment, in which the network includes wireless networks.

FIG. 2 illustrates a variation on the FIG. 1 push environment, in which the network 102 includes wireless networks. Wireless networks include short-range wireless networks including wireless LAN bridges/routers, Bluetooth (a standard promoted by 3Com, Ericsson, Intel, IBM, Lucent, Microsoft, Motorola, Nokia, and Toshiba), or the like, and long-range wireless networks such as microwave systems, satellite systems, cellular communication systems, television transmission towers, etc.

In one embodiment, wireless transmitters comprise a complete transport data pathway between a transmission tower 204 and a receiver, such as a set top box 208, personal digital assistant, portable computer, handheld computer, wireless appliance, or other receiving device. In another embodiment, the wireless signal is partially carried on a physical medium, such as a wire, fiber optic, or other medium, before being received by the set top box 208. Network 206 may or may not be entirely wireless.

Assuming the wireless transmission is an audio and/or visual signal, such as a television signal, a transmitting device 200, which may be a computer or other device providing television signals, transmits multiple television data streams to a multiplexer 202. For example, in digital television, Moving Picture Experts Group (MPEG)-2 data transport streams would be emitted from the multiplexer. A transport stream comprises multiple elementary streams of audio, video, and/or other "data" that is multiplexed and marked with a packet identifier (PID). Under the United States Advanced Television Systems Committee (ATSC) digital television standard, a single "channel" is allotted 19.2 Mbps bandwidth. A single television program typically comprises elementary data streams for video and each supported audio language. With data compression, the program may not consume all available bandwidth for the channel, so the program may become one of several "virtual channels" embedded within the physical spectrum allotted to a broadcaster.

The multiplexer combines these multiple data streams into a single transmission that is transmitted by a tower 204. This transmission is sent over a network 206, and received by a set top box 208, such as a cable television decoding-box, computer device with a television decoder, or other television-aware device.

Figure 3:
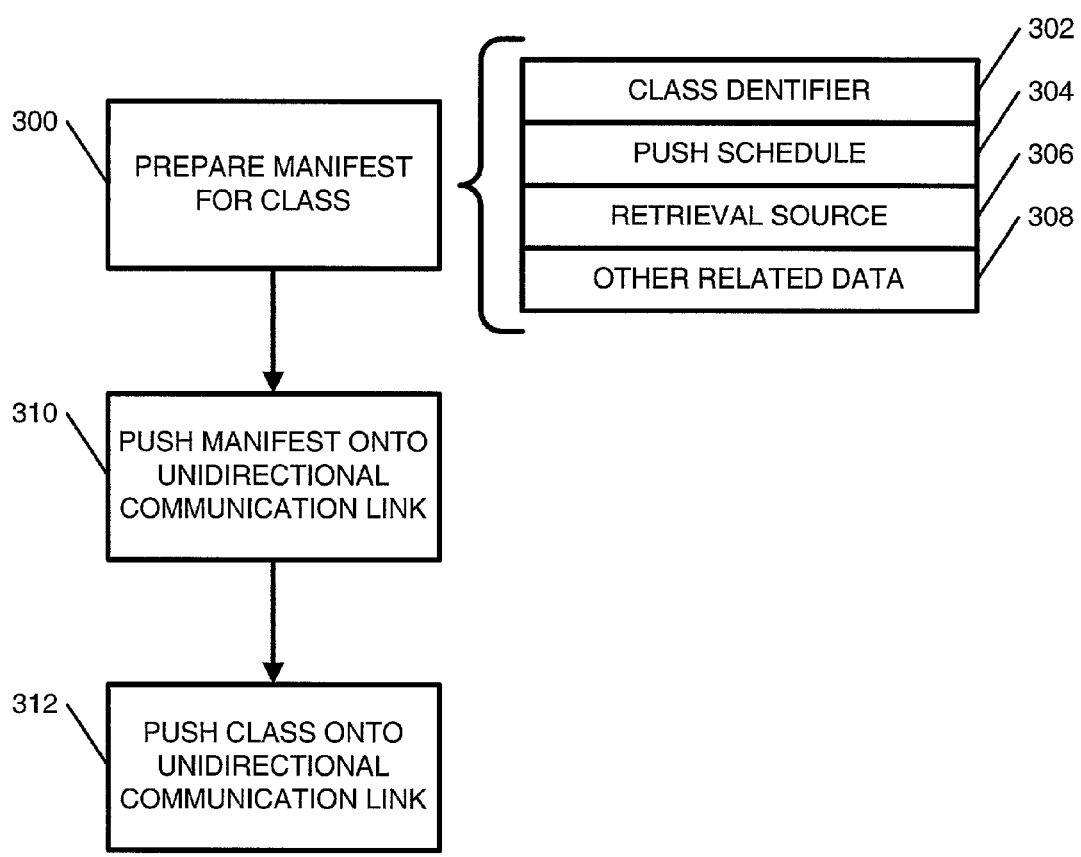
FIG. 3 is a flowchart, according to one embodiment of the invention, for pushing programming code over a unidirectional communication link.

FIG. 3 is a flowchart, according to one embodiment of the invention, for pushing programming code, such as dynamically loadable program code, over a unidirectional communication link such as illustrated in FIG. 1 or FIG. 2.

The unidirectional communication link may be physically unidirectional, as in a transmission from a broadcast tower, or logically unidirectional, as in a unidirectional communication protocol. It is assumed herein that programming code for JAVA programming language classes is pushed to a receiver. However, the disclosed principles and techniques are equally applicable to OBJECTiVE-C, C++, SmallTalk, Modula-3, Component Object Model (COM), and other object oriented programming languages and environments, and the invention is not limited in this respect. It will be appreciated by one skilled in the art that other data structures, besides classes, may be pushed as well. For example, a Dynamic Link Library (DLL), or equivalent, having known entry points and structure may be used.

In an object oriented programming environment such as the one provided by the JAVA programming language, a class encapsulates data, methods and procedures that operate on data input to an instance of the class, and produce appropriate output. Classes are usually collected into libraries for solving particular problems. JAVA programming language libraries are called "Java archives," or JAR files. To minimize memory requirements and facilitate a more dynamic programming model, Java execution environments defer loading a class into system memory until the class is utilized by an executing application program.

When a class is referenced, if it is not already loaded, it is dynamically loaded and made available to an executing program. Loading requires that a standard location (or locations) be searched for the references class, e.g., to locate a JAR file or other storage of class definition. In the JAVA programming language, an environment variable (or equivalent) called "CLASSPATH" is expected to exist and indicate a search path for locating class definitions. For example, CLASSPATH may point to directories/folders containing class definitions and/or JAR files, or directly reference a data file storing archives therein. If a class cannot be found and loaded after searching the CLASSPATH environment, loading fails and the corresponding call within the application program fails.

Thus, in one embodiment, to load dynamically loadable program code over a push-type networking environment, a manifest is first prepared 300 corresponding to the dynamically loadable code. The manifest comprises an identifier 302 that identifies the class definition so that the class can be properly loaded during execution of an application program. In the JAVA programming language, the class definition identifier comprises a package name followed by a relative class name. For example, the "String" class is part of the "java.lang" package, and is therefore properly identified as "java.lang.String". Other programming environments may utilize other identifying data, such as the name of the class, and/or a globally unique identifier (GUID) for the class, and/or a class context, and/or class dependencies.

In one embodiment, the manifest further comprises a push schedule 304, or availability schedule, indicating when class definitions referenced within the manifest will be pushed onto a unidirectional communication link. In this embodiment, the manifest may further comprise a retrieval source 306 if class definitions may be received on one of several unidirectional communication pathways. Other related data 308 may also be stored in the manifest to facilitate routing, verification, billing, or manifest related transactions.

In another embodiment, rather than utilizing a manifest, instead its contents may be directly transmitted over the unidirectional communication link. In this embodiment, an announcement may be broadcast using the SAP/SDP, or equivalent, which indicates an identifier and description of a session, e.g., data to identify dynamically loadable programming code to be pushed, a location from which the code can be retrieved, e.g., a multicast addresses/port for the session, and a schedule of when the code will be pushed.

After creating the manifest, it is pushed 310 onto a unidirectional communication link. Then, in accordance with the push schedule, the dynamically loadable code (e.g., class) referenced by the manifest is pushed 312 onto the unidirectional communication link.

Figure 4:
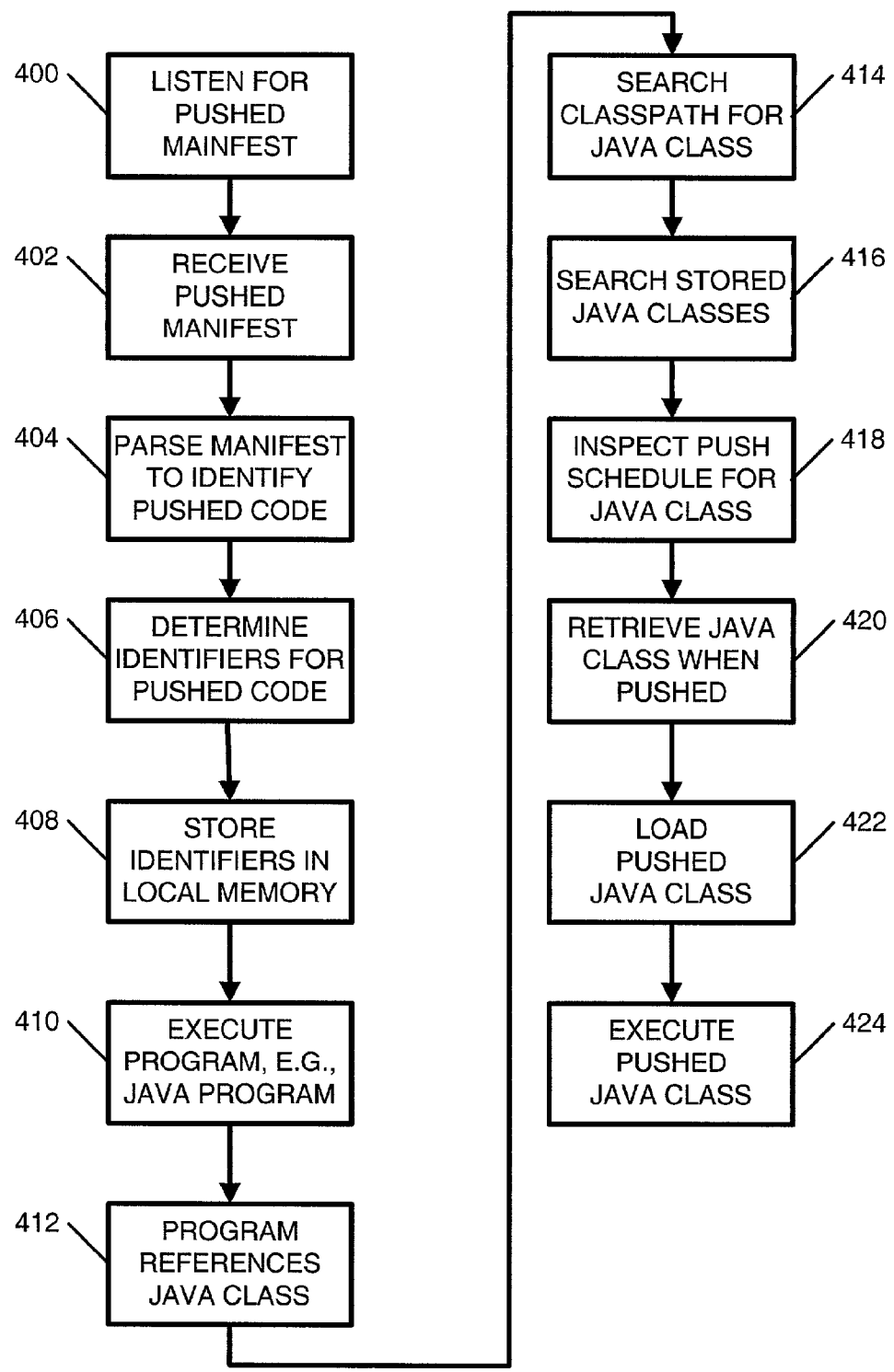
FIG. 4 illustrates a receiver receiving pushed data in accordance with the FIG. 3 embodiment.

FIG. 4 illustrates a receiver receiving pushed data in accordance with the FIG. 3 embodiment. As illustrated, the receiver listens 400 for, and receives 402, a pushed manifest. The manifest is parsed 404 to determine 406 identifiers for dynamically loadable code referenced within the manifest. These identifiers are stored 408 within a local memory, such as volatile or non-volatile storage. As discussed above, the manifest contents may be directly transmitted with SAP/SDP type announcements, in which case the receiver listens for announcements to determine identifiers for dynamically loadable code.

A JAVA programming language application program may be executed 410. When it references 412 a class for the first time, a search 414 may be performed to locate the class, e.g., the CLASSPATH environment is searched. Assuming searching the CLASSPATH fails, a search 416 may be performed to locate the class among pushed class identifiers stored 408 within the local memory. If an appropriate class identifier(s) is located, the schedule corresponding to the identifier may be inspected 418. Dynamically loadable programming code, e.g., a JAVA programming language class file, may then be retrieved 420 from a unidirectional communication link according to the schedule. If SAP/SDP type broadcasting is in use, the dynamically loadable programming code may be retrieved from the multicast address/port indicated in the session's announcement.

In one embodiment, the retrieved dynamically loadable code may be added to the existing CLASSPATH environment so as to avoid future latency in utilizing the retrieved code. In one embodiment, the CLASSPATH comprises a combination of volatile and nonvolatile storage. In this embodiment, standard classes may be stored in nonvolatile storage, such as (erasable) programmable read-only memory (PROM), non-volatile random access memory (NVRAM), complementary metal oxide semiconductor (CMOS), hard-drives, memory sticks, etc. Retrieved code, however, may be stored in volatile storage, e.g., random access memory (RAM).

Thus, for example, portable electronics, set-top boxes, or other electronics not configured with mass storage may be shipped with standard class definitions, and temporarily acquire auxiliary classes as needed during execution of an application program.

After retrieval 420, the dynamically loadable code is loaded 422 in a manner customary to the program language environment in use for execution 424 by the application program. Note that loading 422 may be performed asynchronously to execution of the application program causing the retrieval.

In addition, retrieval and loading may be performed transparently by an operating system, programming environment, or the application program depending on receiver environment configuration. For example, a JAVA programming language runtime environment may determine a class needs to be retrieved 420 from a unidirectional communication link, and then load the class 422 without an application program becoming aware of the retrieval process.

Figure 5:
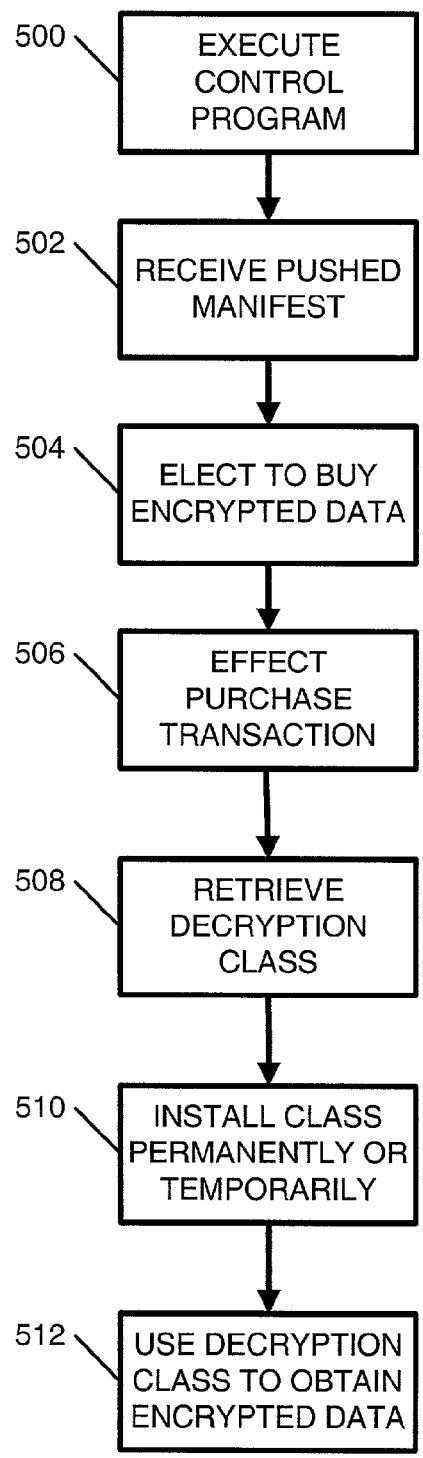
FIG. 5 illustrates use of pushed dynamically loadable data to facilitate a pay-per-use environment.

FIG. 5 illustrates use of pushed dynamically loadable data to facilitate a pay-per-use environment. Typical pay-per-use environments include television, telephone, or computer network broadcast systems, where one or more "premium" data channels are encrypted and transmitted to a receiver, and the receiver can not use the encrypted data without obtaining a decrypting ability.

In this illustrated embodiment, pushed manifests discussed above include identifiers for decryption classes that allow a receiving device to permanently or temporarily obtain encryption ability. The period of availability for decryption capability may be specified in the manifest, or regulated by local and/or remote policies. In one embodiment, temporary encryption is achieved by storing decryption classes in volatile memory that is cleared when a receiving device is reset, power cycled, etc. Clearance may also be according to a clearance schedule, such as hourly, daily, weekly, etc., or according to a schedule indicated within a manifest, e.g., automatic clearance after a certain number of uses, or after an elapsed time after first use, etc.

Thus, a computing device, such as a set top box or portable electronic receiver, e.g., portable television, personal digital assistant, cellular telephone, portable computer, wireless appliance, or the like, executes 500 a control program, such as an operating system or application program. The control program receives 502 a manifest that includes an identifier and push schedule for a decryption class, as well as purchasing data indicating a cost associated with obtaining the premium data by way of the decryption class. A user of the device elects 504, e.g., indicates by way of a graphical user interface, selection of a button on the computing device, etc., a desire to purchase the premium data in accordance with the purchasing data. In response, an appropriate purchase transaction occurs 506 according to the purchasing data in the manifest.

Note that purchase transactions are intended to include purchasing protocols making use of third-party processing and/or billing arrangements. Since the communication link is unidirectional, it is assumed an alternative communication arrangement exists to effect payment. For example, the computing device may have an internal modem in communication with a telephone service, a network interface in communication with a network, or other communication pathway. purchases may be made immediately, or performed on a delayed basis, e.g., the computing device receives election 504 of a purchase, and decryption is performed on assumption that payment will eventually be secured. Delayed payment facilitates using portable receivers intermittently connected to an alternative communication arrangement.

After the purchase transaction 506, the computing device retrieves 508 an appropriate decryption class from the unidirectional communication link in accordance with the push schedule. The decryption class may be installed 516 as indicated by the manifest, e.g., it may be installed either permanently or temporarily. In a JAVA programming language execution environment, the decryption class is installed within the CLASSPATH environment. The decryption class is then executed 512 by the control program to decrypt desired data.

In one embodiment, to prevent theft of the decryption class, the decryption class is itself encoded within a private key of a public/private key pairing in a public key cryptosystem. The communication device may be configured to contain the public key of the pairing, and the communication device decrypts the decryption class with the public key only after purchase transaction 506. In such fashion, decryption classes can be blindly pushed onto an unsecured unidirectional communication link without regard to illicit theft of services.

Figure 6:
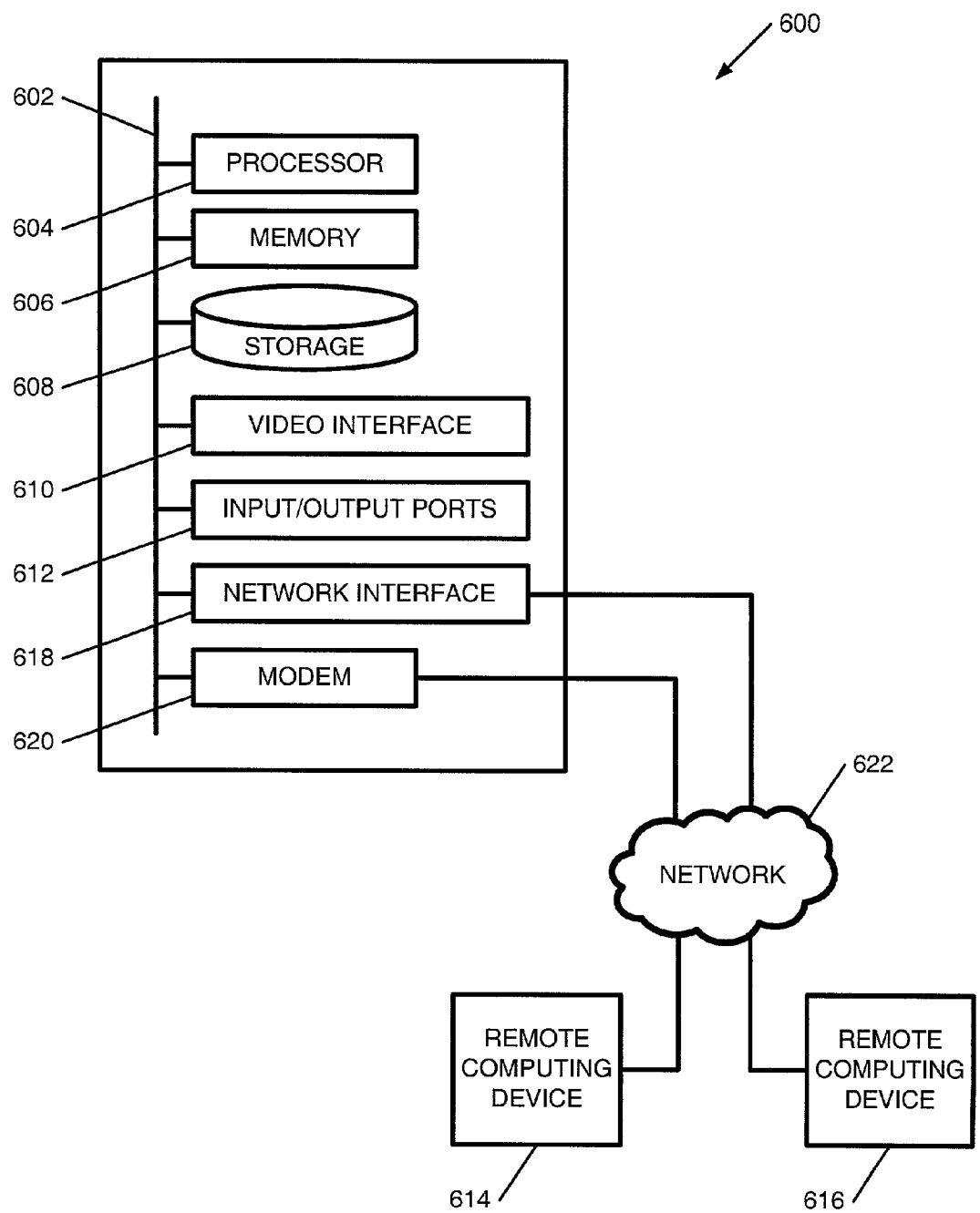
FIG. 6 illustrates a suitable computing environment in which certain aspects of the invention may be implemented.

FIG. 6 and the following discussion are intended to provide a brief, general description of a suitable computing environment in which certain aspects of the illustrated invention may be implemented.

An exemplary system for implementing the invention includes a computing device 600 having system bus 602 for coupling various computing device components. Typically, attached to the bus are non-programmable and programmable processors 604, a memory 606 (e.g., RAM, ROM), storage devices 608, a video interface 610, and input/output interface ports 612. Storage devices include hard-drives, floppy-disks, optical storage, magnetic cassettes, tapes, flash memory cards, memory sticks, digital 20 video disks, and the like.

The invention may be described by reference to different high-level program modules and/or low-level hardware contexts. Those skilled in the art will realize that program modules can be interchanged with low-level hardware instructions. program modules include procedures, functions, programs, components, data structures, and the like, for performing particular tasks or implementing particular abstract data types. Modules may be incorporated into single and multi-processor computing devices, Personal Digital Assistants (PDAs), cellular telephones, portable computers, handheld computers, wireless appliances, and the like. Thus, the storage systems and associated media can store data and executable instructions for the computing device.

The computing device is expected to operate in a networked environment using logical connections to one or more remote computing devices 614, 616 through a network interface 618, modem 620, or other communication pathway. Computing devices may be interconnected by way of a network 622 such as an intranet, the Internet, or other network. Modules may be implemented within a single computing device, or processed in a distributed network environment, and stored in both local and remote memory. Thus, for example, with respect to the illustrated embodiments, assuming computing device 600 is a transmitter of pushed dynamically loadable programming code, then remote devices 614, 616 may respectively be a set top box and a portable wireless receiver of the pushed code.

It will be appreciated that remote computing devices 614, 616 may be configured like computing device 600, and therefore include many or all of the elements discussed for computing device. It should also be appreciated that computing devices 600, 614, 616 may be embodied within a single device, or separate communicatively-coupled components, and may include or be embodied within routers, bridges, peer devices, web servers, and application programs utilizing network application protocols such as the HyperText Transfer Protocol (HTTP), File Transfer protocol (FTP), and the like.

Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless implicitly or expressly indicated otherwise, embodiments are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method, comprising:
   determining an identifier for dynamically loadable code, wherein the dynamically loadable code comprises a class definition of an object oriented programming language;
   pushing the identifier onto a unidirectional communication link, wherein the identifier identifies the class definition;
   pushing the availability schedule onto the unidirectional communication link, the availability schedule indicates when the dynamically loadable code will be pushed onto the unidirectional communication link; and
   pushing the dynamically loadable code onto the unidirectional communication link subsequent to the availability schedule and according to the availability schedule, wherein the dynamically loaded code is to be dynamically loaded at its destination according to the identifier and the availability schedule in order to conserve resources at the destination.

2. The method of claim 1, wherein the unidirectional communication link is a selected one of: a television data transmission, an MPEG-2 transport stream, and IP-multicast.

3. The method of claim 1, further comprising: receiving data over the unidirectional communication link with a selected one of: a set top box, a personal digital assistant, a portable computer, a handheld computer, and a wireless appliance.

4. The method of claim 1, further comprising:
   receiving the identifier and the availability schedule over the unidirectional communication link; and retrieving the dynamically loadable code from said communication link according to the availability schedule.

5. The method of claim 4, further comprising:
   determining whether the dynamically loadable code is required for executing an application program; and
   performing said retrieving responsive to said determining.

6. An apparatus, comprising:
   a machine accessible medium providing instructions, which when executed by a machine, are capable of directing the machine to perform the operations of claim 1.

7. The apparatus of claim 6, wherein the unidirectional communication link is a selected one of: a television data transmission, an MPEG-2 transport stream, and IP-multicast.

8. The apparatus of claim 6, said instructions including further instructions to direct the machine to perform:
   receiving data over the unidirectional communication link with a selected one of: a set top box, a personal digital assistant, a portable computer, a handheld computer, and a wireless appliance.

9. The apparatus of claim 6, said instructions including further instructions to direct the machine to perform:
   receiving the identifier and the availability schedule over the unidirectional communication link; and
   retrieving the dynamically loadable code form said communication link according to the availability schedule.

10. The apparatus of claim 9, said instructions including further instructions to direct the machine to perform:
    determining whether the dynamically loadable code is required for executing an application program; and
    performing said retrieving responsive to said determining.

11. A method, comprising:
    preparing a manifest for dynamically loadable code, said manifest comprising an identifier for dynamically loadable code, and an availability schedule, wherein the dynamically loadable code comprises a class definition of an object oriented programming language, and wherein the identifier identifies the class definition;
    pushing the manifest onto a unidirectional communication link, wherein the availability schedule of the manifest indicates when the dynamically loadable code will be pushed onto the unidirectional communication link; and
    pushing the dynamically loadable code onto said communication link subsequent to said manifest and according to the availability schedule, wherein the dynamically loadable code is to be dynamically loaded at its destination according to the identifier and the availability schedule in order to conserve resources at the destination.

12. The method of claim 11, wherein the dynamically loadable code is written in a selected one of: JAVA OBJECTIVE-C, C++, SmallTalk, Modula-3, Component Object Model, and an object-oriented scripting language.

13. The method of claim 11, wherein the unidirectional communication link is a selected one of: a television data transmission, an MPEG-2transport stream, and IP-multicast.

14. The method of claim 11, further comprising:
    receiving the unidirectional communication link with a selected one of: a set top box, a personal digital assistant, a portable computer, a handheld computer, and a wireless appliance.

15. The method of claim 11, further comprising:
    receiving the manifest over said communication link;
    recording the identifier and the availability schedule; and
    retrieving the dynamically loadable code when it is pushed onto said communication link according to the availability schedule.

16. The method of claim 11 further comprising:
    determining whether the dynamically loadable code is required for executing an application program; and
    retrieving responsive to said determining.

17. A method for mirroring a JAVA archive file, comprising:
    preparing a manifest for a JAVA archive file, said manifest comprising identifiers for objects of the JAVA archive file, and an availability schedule for said objects, wherein the availability schedule indicates when the JAVA archive file will be pushed onto a unidirectional communication link;
    pushing the manifest onto the unidirectional communication link; and
    pushing said objects of the JAVA archive file onto the unidirectional communication link subsequent to the manifest and in accordance with the availability schedule, wherein the JAVA archive file is to be dynamically loaded at its destination according to the identifiers and the availability schedule in order to conserve resources at the destination.

18. The method of claim 17, further comprising:
    executing programming code;
    determining whether an unavailable object is required for said executing;
    determining whether the manifest includes an identifier corresponding to the object; and receiving said required object over the unidirectional communication link.

19. The method of claim 18, further comprising:
storing said received object in a temporary memory location disposed within a device;
wherein resetting the device causes said received object to be discarded.

20. The method of claim 17, wherein the manifest for the JAVA archive file includes purchasing data for said objects of the JAVA archive file, the method further comprising:
identifying an unavailable object that is required for executing a program;
determining whether the manifest includes an identifier corresponding to the object;
receiving said required object over the unidirectional communication link; and
purchasing said required object in accord with said purchasing data.

21. A method for obtaining dynamically loadable code over a push-only network, comprising:
receiving, over a unidirectional communication link of the push-only network, a manifest for dynamically loadable code, said manifest comprising an identifier for dynamically loadable code, and an availability schedule, wherein the availability schedule of the manifest indicates when the dynamically loadable code will be received on the unidirectional communication link of the push-only network, and wherein the dynamically loadable code comprises a class definition of an object oriented programming language; and
receiving, over the unidirectional communication link of the push-only network, the dynamically loadable code subsequent to the manifest and in accord with the availability schedule, wherein the dynamically loadable code is to be dynamically loaded at its destination according to the identifier and the availability schedule to conserve resources at the destination.

22. The method of claim 21, wherein the dynamically loadable code comprises a selected one of: a single object oriented object, a plurality of object oriented object definitions, and a Dynamic Link Library (DLL).

23. The method of claim 21, further comprising:
determining whether an application program requires dynamically loadable code; and
determining whether the manifest includes an identifier corresponding to said dynamically loadable code.

24. The method of claim 23, further comprising:
inspecting a CLASSPATH environment for a class containing said required dynamically loadable code; and
determining whether said required dynamically loadable code is unavailable.

25. The method of claim 24, further comprising:
adding said received dynamically loadable code to the CLASSPATH environment.

26. The method of claim 21, wherein the dynamically loadable code comprises a JAVA programming language class, the method further comprising:
inspecting a CLASSPATH environment for a class containing the dynamically loadable code; and
determining whether said required dynamically loadable code is unavailable, and responsive thereto, performing said receiving the dynamically loadable code.

27. The method of claim 21, further comprising:
adding said received dynamically loadable code to a local storage for dynamically loadable code.

28. An apparatus, comprising:
a machine accessible medium providing instructions, which when executed by a machine, are capable of directing the machine to perform:
preparing a manifest for dynamically loadable code, said manifest comprising an identifier for dynamically loadable code, and an availability schedule, wherein the dynamically loadable code comprises a class definition of an object oriented programming language, and wherein the identifier identifies the class definition;
pushing the manifest onto a unidirectional communication link, wherein the availability schedule of the manifest indicates when the dynamically loadable code will be pushed onto the unidirectional communication link; and
pushing the dynamically loadable code onto said communication link subsequent to said manifest and according to the availability schedule, wherein the dynamically loadable code is to be dynamically loaded at its destination according to the identifier and the availability schedule in order to conserve resources at the destination.

29. The apparatus of claim 28, said instructions including further instructions to direct the machine to perform receiving the unidirectional communication link with a selected one of: a set top box, a personal digital assistant, a portable computer, a handheld computer, and a wireless appliance.

30. The apparatus of claim 28, said instructions including Luther instructions to direct the machine to perform:
receiving the manifest over said communication link;
recording the identifier and the availability schedule; and
retrieving the dynamically loadable code when it is pushed onto said communication link according to the availability schedule.

31. The apparatus of claim 28, said instructions including further instructions to direct the machine to perform:
determining whether the dynamically loadable code is required for executing an application program; and
performing said retrieving responsive to said determining.

32. An apparatus for mirroring a JAVA archive file, comprising a machine accessible medium providing instructions, which when executed by a machine, are capable of directing the machine to perform:
preparing a manifest for a JAVA archive file, said manifest comprising identifiers for objects of the JAVA archive file, and an availability schedule for said objects, wherein the availability schedule indicates when the JAVA archive file will be pushed onto a unidirectional communication link;
pushing the manifest onto the unidirectional communication link; and
pushing said objects of the JAVA archive file onto the unidirectional communication link subsequent to the manifest and in accordance with the availability schedule, wherein the JAVA archive file is to be dynamically loaded at its destination according to the identifiers and the availability schedule in order to conserve resources at the destination.

33. The apparatus of claim 32, said instructions including further instructions to direct the machine to perform:
determining whether an unavailable object is required for executing an application;
determining whether the manifest includes an identifier corresponding to the object; and
receiving said required object over the unidirectional communication link.

34. The apparatus of claim 32, said instructions including further instructions to direct the machine to perform:
- determining whether an unavailable object is required for executing an application;
- determining whether the manifest includes an identifier corresponding to the object; and
- receiving said required object over the unidirectional communication link.

35. The apparatus of claim 32, said instructions including further instructions to direct the machine to perform operations including:
- purchasing data for said objects of the JAVA archive file in the manifest; identifying an unavailable object tilt is required for executing a program;
- determining whether the manifest includes an identifier corresponding to the object; receiving said required object over the unidirectional communication link; and
- purchasing said required object in accord with said purchasing data.

36. A apparatus for obtaining dynamically loadable code over a push-only network, comprising a machine accessible medium providing instructions, which when executed by a machine, are capable of directing the machine to perform:
- receiving, over a unidirectional communication link of the push-only network, a manifest for dynamically loadable code, said manifest comprising an identifier for dynamically loadable code, and an availability schedule, wherein the availability schedule of the manifest indicates when the dynamically loadable code will be received on the unidirectional communication link of the push-only network, and wherein the dynamically loadable code comprises a class definition of an object oriented programming language; and
- receiving, over the unidirectional communication link of the push-only network, the dynamically loadable code subsequent to the manifest and in accord with the availability schedule, wherein the dynamically loadable code is to be dynamically loaded according to the identifier and the availability schedule in order to conserve resources at the apparatus.

37. The apparatus of claim 36, said instructions including further instructions to direct the machine to perform:
- determining whether an application program requires dynamically loadable code; and
- determining whether the manifest includes an identifier corresponding to said dynamically loadable code.

38. The apparatus of claim 37, said instructions including further instructions to direct the machine to perform:
- inspecting a CLASSPATH environment for a class containing said required dynamically loadable code; and
- determining whether said required dynamically loadable code is unavailable.

39. The apparatus of claim 37, said instructions including further instructions to direct the machine to perform:
- adding said received dynamically loadable code to the CLASSPATH environment.

40. The apparatus of claim 36, said instructions including further instructions to direct the machine to perform:
- inspecting a CLASSPATH environment for a class containing the dynamically loadable code; and
- determining whether said required dynamically loadable code is unavailable, and responsive thereto, performing said receiving the dynamically loadable code.

41. A system, comprising:
- at least one processor; and
- a machine-readable medium having instructions encoded thereon, which when executed by the processor, are capable of directing the processor to perform:
  - preparing a manifest for dynamically loadable code, said manifest comprising an identifier for dynamically loadable code, and an availability schedule, wherein the dynamically loadable code comprises a class definition of an object oriented programming language, and wherein the identifier identifies the class definition;
  - pushing the manifest onto a unidirectional communication link, wherein the availability schedule of the manifest indicates when the dynamically loadable code will be pushed onto the unidirectional communication link; and
  - pushing the dynamically loadable code onto said communication link subsequent to said manifest and according to the availability schedule, wherein the dynamically loadable code is to be dynamically loaded at its destination according to the identifier and the availability schedule in order to conserve resources at the destination.

42. The system of claim 41, said instructions including further instructions to direct the processor to perform:
- receiving the unidirectional communication link with a selected one of: a set top box, a personal digital assistant, a portable computer, a handheld computer, and a wireless appliance.

43. The system of claim 41, said instructions including further instructions to direct the processor to perform:
- receiving the manifest over said communication link;
- recording the identifier and the availability schedule; and
- retrieving the dynamically loadable code when it is pushed onto said communication link according to the availability schedule.

44. A system for mirroring a JAVA archive file, comprising:
- at least one processor; and
- a machine-readable medium having instructions encoded thereon, which when executed by the processor, are capable of directing the processor to perform:
  - preparing a manifest for a JAVA archive file, said manifest comprising identifiers for objects of the JAVA archive file, and an availability schedule for said objects, wherein the availability schedule indicates when the JAVA archive file will be pushed onto a unidirectional communication link;
  - pushing the manifest onto the unidirectional communication link; and
  - pushing said objects of the JAVA archive file onto the unidirectional communication link subsequent to the manifest and in accordance with the availability schedule, wherein the JAVA archive file is to be dynamically loaded at its destination according to the identifiers and the availability schedule in order to conserve resources at the destination.

45. The system of claim 44, said instructions including further instructions to direct the processor to perform:
- determining whether an unavailable object is required for executing an application;
- determining whether the manifest includes an identifier corresponding to the object; and
- receiving said required object over the unidirectional communication link.

46. The system of claim 44, said instructions including further instructions to direct the processor to perform operations including:

purchasing data for said objects of the JAVA archive file in the manifest;

identifying an unavailable object that is required for executing a program;

determining whether the manifest includes an identifier corresponding to the object;

receiving said required object over the unidirectional communication link; and purchasing said required object in accord with said purchasing data.

47. A system for obtaining dynamically loadable code over a push-only network, comprising:

at least one processor; and a machine-readable medium having instructions encoded thereon, which when executed by the processor, are capable of directing the processor to perform:

receiving, over a unidirectional communication link of the push-only network, a manifest for dynamically loadable code, said manifest comprising an identifier for dynamically loadable code, and an availability schedule, wherein the availability schedule of the manifest indicates when the dynamically loadable code will be received on the unidirectional communication link of the push-only network, and wherein the dynamically loadable code comprises a class definition of an object oriented programming language; and receiving, over the unidirectional communication link of the push-only network, the dynamically loadable code subsequent to the manifest and in accord with the availability schedule, wherein the dynamically loadable code is to be dynamically loaded at its destination according to the identifier and the availability schedule in order to conserve resources at the destination.

48. The system of claim 47, said instructions including further instructions to direct the processor to perform:

determining whether an application program requires dynamically loadable code; and determining whether the manifest includes an identifier corresponding to said dynamically loadable code.

49. The system of claim 47, said instructions including further instructions to direct the processor to perform:

inspecting a CLASSPATH environment for a class containing said required dynamically loadable code;

determining whether said required dynamically loadable code is unavailable; and adding said received dynamically loadable code to the CLASSPATH environment.

* * * * *